United States Patent [15] 3,692,935

Manber [45] Sept. 19, 1972

[54] SINGLE LINE SCAN PATTERN GENERATOR

[72] Inventor: Solomon Manber, Sands Point, N.Y.

[73] Assignee: Alphanumeric, Incorporated, Lake Success, N.Y.

[22] Filed: Feb. 17, 1971

[21] Appl. No.: 116,132

[52] U.S. Cl. ....................178/15
[51] Int. Cl. ....................H041 15/34
[58] Field of Search......178/15, 30; 346/74 CR, 74 P

[56] References Cited

UNITED STATES PATENTS

| | | | |
|---|---|---|---|
| 3,132,206 | 5/1964 | King | 178/15 |
| 3,313,883 | 4/1967 | Huntley | 178/15 |
| 2,619,533 | 11/1952 | Ress | 178/30 |
| 2,930,847 | 3/1960 | Metzger | 178/30 |
| 3,512,158 | 5/1970 | Scarbrough | 178/30 |

*Primary Examiner*—Kathleen H. Claffy
*Assistant Examiner*—Horst F. Brauner
*Attorney*—Hane, Baxley & Spiecens

[57] ABSTRACT

A pattern generator includes a rotating record-medium-carrying drum which is scanned by an intensity-modulated beam of electromagnetic radiation. The beam sequentially scans adjacent linear regions in a peripheral band of the record medium. The beam is turned on and off during the scans to write characters.

3 Claims, 2 Drawing Figures

Figure 1:
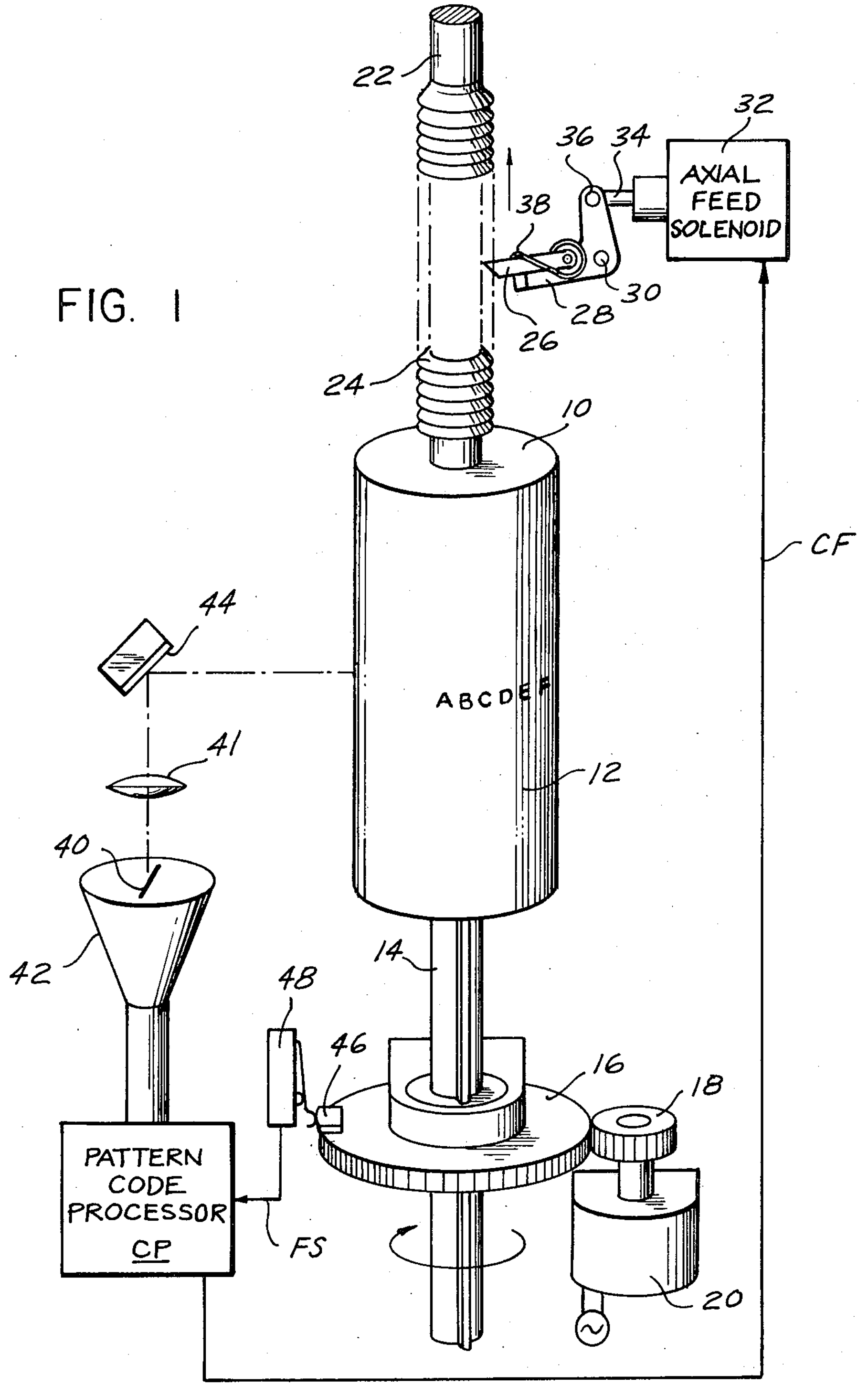

INVENTOR.
SOLOMON MANBER
BY Hane, Baxley and Spiecens
ATTORNEYS

INVENTOR.
SOLOMON MANBER
BY Hane, Baxley and Spiecens
ATTORNEYS

SINGLE LINE SCAN PATTERN GENERATOR

This invention pertains to pattern generators and more particularly to such generators which can record graphic arts quality characters on a record medium.

Lately, there have become available pattern generators which are used to replace hot lead printing plates. Such pattern generators write the text onto the face of a cathode-ray tube. The image of the text on the face of the cathode-ray tube is optically projected onto a photographic film. The film after development becomes the negative for a printing plate.

In order to produce high quality negatives expensive cathode-ray tubes including complex distortion correction circuits and complex and expensive optical systems are required. Even after going to this expense the size of the negative is still too small to print wide pages such as used in newspapers.

It is accordingly an object of the invention to provide a pattern generator which solves the above-mentioned problems.

Briefly, the invention contemplates a pattern generator which includes a rotatable cylindrical support means for supporting a record medium on its periphery. Means direct a beam of source energy to repetatively scan axially while the beam is intensity modulated. The beam is aimed toward the periphery of the cylindrical support means in such a manner that the beam scans, on the periphery, a straight line which is parallel to the rotational axis of the cylindrical support means so that as the support means rotates the beam sequentially scans laterally displaced parallel straight lines on a peripheral band of the record medium.

Figure 2:
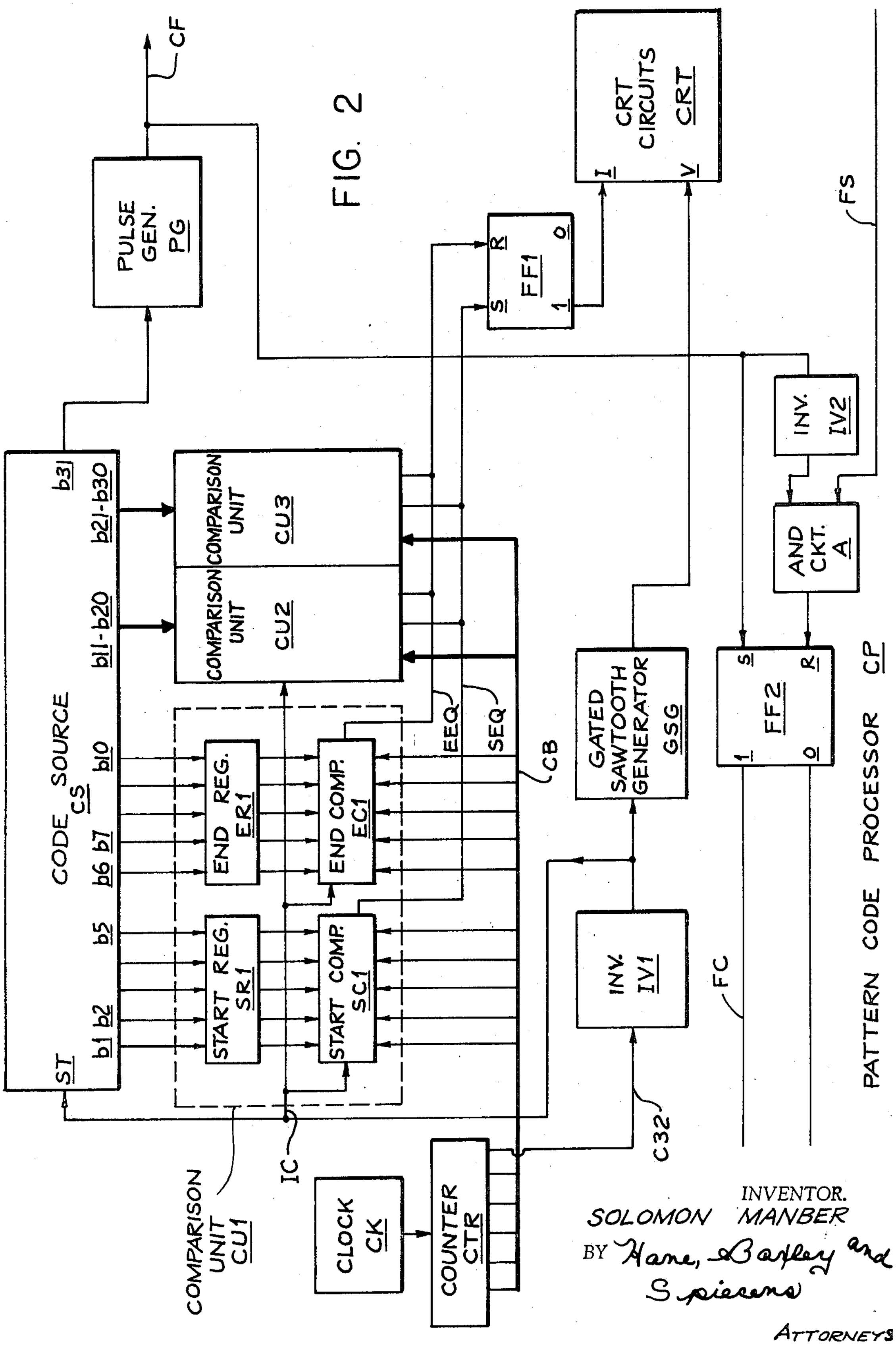

Other objects, the features and advantages of the invention will be apparent from the following detailed description when read with the accompanying drawing which shows by way of illustration and not limitation apparatus for realizing the invention;

In the drawing:

FIG. 1 schematically shows a pattern generator utilizing a cathode-ray tube in accordance with the invention; and FIG. 2 is a logic and schematic diagram of circuitry for controlling the cathode-ray tube of the pattern generator of FIG. 1.

In general, the system can generate a line of characters at a time wherein the characters are serially generated along the line. When one line is completely generated, the system can start generating the next line of characters. The lines of characters will, in being generated, modulate a beam of electromagnetic radiation such as a light source which creates visual representations of the characters for exposure onto an electromagnetic radiation or light sensitive record medium such as a photographic film. The film thereafter can be used as a negative for creating printing plates. Therefore, each character will be recorded on an area of one visual state such as one color (for example, white) and the character itself will comprise line portions in a second visual state such as a contrasting color (for example, black).

Not only are the characters generated serially along a line, but each of the actual characters is generated by a sequential plurality of vertical lines or column elements of varying lengths. If one assumes a given maximum height for any character, then each vertical line will have a maximum length. One can divide this maximum length into a number of, for example 32, equal increments. Thereafter, for each vertical line of a character one need only specify the start and end address for each contiguous column segment of, say, black. (It will be assumed that there can be up to three such segments in each line). These addresses will be used to turn the beam on and off during the scan of the vertical line.

A more detailed description of such coding techniques can be found in U.S. Pat. No. 3,471,848. For the present application it need be known that the beam be turned on and off at particular points in the scans of vertical lines.

In FIG. 1. the pattern generator is shown comprising a drum 10 on whose periphery is mounted a record medium 12 by means (not shown). Drum 10 is rotationally driven, via splined shaft 14, by gear 16 meshing with pinion 18 which is driven by motor 20. Splined shaft 14 can axially move in the bearing of gear 16 and in fact controlled axially movement of drum 10 is required. Such controlled axial movement is provided by the cooperation of shaft 22 having equispaced ramp-like collars 24 with finger 26 mounted on bell crank 28 which pivots about axis 30. Whenever, there is to be a line feed, axial feed solenoid 32 is pulsed by a signal on line CF from pattern code processor CP. The shaft 34 of the solenoid retracts and, by virtue of the pin connection 36, clockwise rotates bell crank 28 causing finger 26 to engage an adjacent collar 24 moving the drum 12 upward one line. When the solenoid is then denergized finger 26, through the action of spring 38, traps to rest against the next lower collar. It should be noted that although a specific axial drive means is disclosed other suitable drive means come within the preview of the invention.

During the writing of the characters when drum 12 is rotating an intensity modulated single line scan is traced on the screen of the cathode-ray tube 42. The trace is focused by lens 41 and reflected by fixed mirror 44 onto a peripheral band of the record medium 12. (It should be noted that the scan 40 is suitable skewed so that the vertical lines written onto the record medium 12 are parallel to the axis of the drum 10). The intensity modulation of the scan is controlled by pattern code processor CP. Finally, a boss 46 fixed to gear 16 trips microswitch 48 at the same position of each rotation to indicate the left hand margin of a page. Whenever activated by boss 46 microswitch 48 transmits a pulse on line FS to pattern code processor CP to give a left hand margin indication.

In operation, at the end of line of writing, pattern code processor CP emits a pulse on a line CF to initiate an axial line feed. At the end of the axial line feed and after microswitch 48 transmits its indicating pulse pattern code processor CP activates cathode-ray tube 42 to perform the intensity modulated vertical scans to generate the various column segments which form the characters of the next line.

The pattern code processor CP of FIG. 2 includes a code source CS. The code source CS can be a computer, a tape drive assemblage or the like which performs the function of transmiting one 31 bit word from its output *b*1 to *b*31 each time it receives a pulse at its step input ST. Assuming a vertical scan is from the top of the character to the bottom, the bits have the following significance:

| | |
|---|---|
| b1 to b5 | the start address of first column segment |
| b6 to b10 | the end address of first column segment |
| b11 to b15 | the start address of second column segment |
| b16 to b20 | the end address of second column segment |
| b21 to b25 | the start address of third column segment |
| b26 to b30 | the end address of third column segment |
| b31 | line feed pulse |

The format is such that if no column segment is to be written the start and end addresses are 11111. Furthermore, whatever an axial line feed is to take place the code word transmitted from code source CS contains all binary ones. Whenever there is no call for such a line feed bit b31 will be 0 (zero), the start and end addresses however will have their appropriate values.

The *b*1 to *b*30 outputs of code source CS are fed in parallel to comparison units CU1 to CU3, one for each of the possible three columns segments in a vertical scan line. Since each of the comparison units is the same except for its input connections to the *b*1 to *b*30 outputs of code source CS only the comparison unit CU1 will be described in detail. Comparison unit CU1 includes: the start register SR1 which can be a five-stage flip-flip register, each of whose stage inputs is connected in parallel to one of the outputs *b*1 to *b*5 to accept the start address of the first column segment; the end register ER1 which can be a five-stage flip-flop register, each of whose stage inputs is connected in parallel to one of the outputs *b*6 to *b*10 to accept the end address of the first column segment; the start comparator SC1 is a parallel equality comparator which compares the start address number represented by states of the start register SR1 with a running count number represented by the states of signals on lines of a counter bus CB and gives an output pulse of line SEQ when an equality is sensed; and end comparator EC1 which is the same as start comparator SC1 except that it receives an end address number from end register ER1 and transmits and equality pulse of line EEQ. The comparators are standard except that they include a circuit such as an AND-gate which inhibits an equality output signal whenever a signal is present on line IC.

The running count number represented by the signals of counter bus CB is generated by counter CTR which counts pulses from clock CK. Counter CTR can, for the above-cited example, be a conventional binary modulo-64 counter with the further provision of being forced to hold a count of 32 as long as a signal is present on line FC.

Since the remaining components of the code processor CP are well known they will be described during the discussion of the operation of the pattern code processor CP which now follows.

Assume that flip-flop FF1 is cleared to its zero state, the flip-flop FF2 to its one state and the first code word from code source CS is an axial line feed word, i.e., a word having all binary ones. Thus, all the registers in the comparison units CU1 to CU3 receive addresses 31. Since counter CTR is forced to a count of 32 and locked to that count the comparators cannot sense an equality at this time. However, the *b*31 output of code source CS emits a signal which triggers pulse generator PG to emit a pulse on line CF. This pulse has sufficient duration to cause the drum to axial line feed once. Thus pulse generator PG can be a conventional "one-shot" which emits a positive pulse of the required time duration. The leading edge of this pulse is fed to the set input of conventional set-reset flip-flop FF2. Since flip-flop FF2 is set it does not change its state. Normally, i.e., after the first line of characters is written, at a line feed function flip-flop FF2 would be reset. Thus all line feed functions set flip-flop FF2.

Since the counter CTR is set to a count of 32 a signal is present on line C32, The output of the fifth counter stage, this signal is inverted by inverter IV1. The output of inverter IV1 is connected to the input of gated sawtooth generator GSG which generates a sawtooth waveform voltage which starts at the loading edge of a positive going signal and ends at the trailing edge of such signal. Thus, at this time no saw tooth waveform voltage is being generated. The output of inverter IV1 is also fed to line IC inhibiting equality outputs from the comparators. The output of inverter IV1 is also connected to the step input ST of code source SC. The leading edge of the negative going signal from the output of inverter IV1 whenever counter CTR attains the count of 32 triggers code source CS to feed the next code word to outputs *b*1 to *b*31. Thus the new code word is loaded into the registers of the comparison units CU1 to CU3 but it has no effect at this time since counter CTR is stalled at the count of 32. At the end of the pulse from pulse generator PG the output of inverter IV2 goes high alterting AND-gate A. The first fiducial pulse thereafter on line FS indicating the left hand margin of the record medium resets flip-flop FF2 dropping the signal on line FC.

Counter CTR starts counting from 32 and when counter CTR steps from a count of 63 to a count of 0 (zero), the signal on line C32 drops causing the output of inverter IV1 to rise. Sawtooth generator GSG is gated on, feeding a sawtooth waveform to the vertical deflection input V of the cathode-ray tube circuits CRT. At the same time the signal on line IC drops allowing the comparison units to operate. Assume there are only two column segments to this vertical line of the character and that their start and end addresses are 02 and 06, and 12 and 20. The third column segment position will then have a start address of 31(11111) and an end address of 31 since no such column segment is present.

When the count in counter CTR reaches the count of 02 start comparator SC1 emits a pulse of line SEQ which sets set-reset flip-flop FF1. The "1" output of flip-flop FF1 which is connected to the intensity input I of cathode-ray tube circuits CRT rises turning on the beam of the cathode-ray tube. When the count in counter CTR reaches the count of 06, end comparator EC1 emits a pulse on line EEQ which is connected to the reset input of flip-flop FF1. The flip-flop resets and the beam of the cathode-ray tube is turned off.

When the count is counter CTR reaches the count of 12, the start comparator in comparison unit CU2 emits a pulse on line SEQ again setting flip-flop FF1; and when the count is counter CTR reaches the count of 20, the end comparator in comparison unit CU2 emits a pulse on line EEQ again resetting flip-flop FF1.

At the counter of 31 in counter CTR both the start comparator and the end comparator of comparison unit CU3 emit pulses on lines SEQ and EEQ respectively. By specifying that flip-flop FF1 is reset dominant, the flip-flop remains reset.

When counter CTR reaches the count of 32 a signal is again generated on line C32. Accordingly, (1) the sawtooth waveform terminates and the retrace interval takes place; (2) the comparators are blocked; and (3) code source CS is stepped to emit the next code word.

when the counter CTR goes from the count of 63 to 0 (zero) a new scan starts with the writing of column segments of the next vertical line. Successive vertical lines are sequentially written until code source CS emits a line feed word to step the axial line feed so that the next line of characters can be written.

There has thus been shown an improved pattern generator wherein an intensity modulated one line trace is focused on a rotating record medium to write characters or patterns.

While specific examples and elements have been disclosed it should be realized that there are many variations which come within the scope of the invention. For example, the number of increments in a vertical scan can be more or less than 32. In fact for very high quality output over a hundred increments are used. Furthermore, the number of possible column segments in a line can be more than three. With respect to the projection apparatus it should be realized that the mirror could be eliminated and the cathode-ray tube axis be aligned perpendicular to the axis of the drum. It is also not necessary to axially move the drum to obtain line feeds. One could move the drum to obtain line feeds. One could move the cathode-ray tube and mirror or move the mirror and refocus the cathode-ray tube optics assemblage.

What is claimed:

1. A pattern generator comprising a rotatably cylindrical support means for supporting a record medium on the periphery thereof, a source of a beam of energy, means for directing the beam of energy to repetitively scan a same straight line, means for intensity modulating the beam of energy during at least some of said scans, means for projecting the beam of energy toward the periphery of said rotatable cylindrical support means in such a way that the beam of energy scans on said periphery a straight line which is parallel to the axis of rotation of said rotatably cylindrical support means, means for rotating said rotatable cylindrical support means so that said beam of energy sequentially scans parallel straight lines that are laterally displaced from each other on a first peripheral band of said rotatable cylindrical support means and means operative after the scan of said parallel straight lines on said first peripheral band, for causing the beam of energy to scan parallel straight lines that are laterally displaced from each other on another peripheral band axially displaced from said first peripheral band.

2. The pattern generator of claim 1 wherein said source of a beam of energy comprises a cathode-ray tube means.

3. The pattern generator of claim 1 wherein said means for intensity modulating the beam of energy comprises binary modulating means.

* * * * *